United States Patent [19]

Jackson et al.

[11] 4,201,973
[45] May 6, 1980

[54] AIRPORT LANDING INDICATOR APPARATUS

[75] Inventors: Theodore Jackson, P.O. Box 407, Council, Id. 83612; Ken Johnson, Council, Id.

[73] Assignee: Theodore Jackson, Council, Id.

[21] Appl. No.: 926,629

[22] Filed: Jul. 21, 1978

[51] Int. Cl.² .......................... G08G 5/00; H04B 7/26
[52] U.S. Cl. ...................................... 340/26; 73/188; 73/189; 340/25; 340/694
[58] Field of Search .................... 340/25, 26, 34, 27 R, 340/27 NA; 343/225; 362/276; 73/188, 189; 315/77, 82, 83; 244/114 R; 250/206, 215

[56] References Cited

U.S. PATENT DOCUMENTS

| 1,342,860 | 6/1920 | Mortimer et al. | 340/26 |
| 1,475,075 | 11/1923 | Macy | 340/26 |
| 1,496,486 | 6/1924 | Pedu | 340/26 |
| 1,644,547 | 10/1927 | Smith | 340/26 |
| 1,776,111 | 9/1930 | Donaldson | 340/26 |
| 2,355,607 | 8/1944 | Shepherd | 340/34 |
| 3,117,299 | 1/1964 | Lemm et al. | 340/26 |
| 3,122,721 | 2/1964 | Liu et al. | 340/25 |

FOREIGN PATENT DOCUMENTS 299699  8/1929  United Kingdom .................... 340/26

OTHER PUBLICATIONS

"Automatic Airport Lights Send Out Beams at Whims of Wind", *The New York Telegram*, Oct. 1929, p. 18.

*Primary Examiner*—John W. Caldwell, Sr.
*Assistant Examiner*—James J. Groody
*Attorney, Agent, or Firm*—Paul F. Horton

[57] ABSTRACT

Airport landing indicator apparatus designed basically for remote airports and landing fields including means responsive to wind direction and a pair of runway locators, in the form of lighted directional arrows, located at opposing ends of a runway. Wind direction determines which of the arrows will be lit for maximum safety in landing. Each of the runway locators includes a multiplicity of high intensity lamps forming an outline of a first arrow and a multiplicity of low intensity lamps contained within the confines of the high intensity lamps forming a second arrow. All lamps of a particular runway locator may be turned on by radio control from an approaching aircraft. The high intensity lamps, necessary for long distance observation, are automatically turned off by means of a photoelectric cell actuated by landing lights of the approaching aircraft to prevent temporary blindness. The apparatus may also contain a lighted specific wind direction indicator and a wind velocity indicator.

2 Claims, 6 Drawing Figures

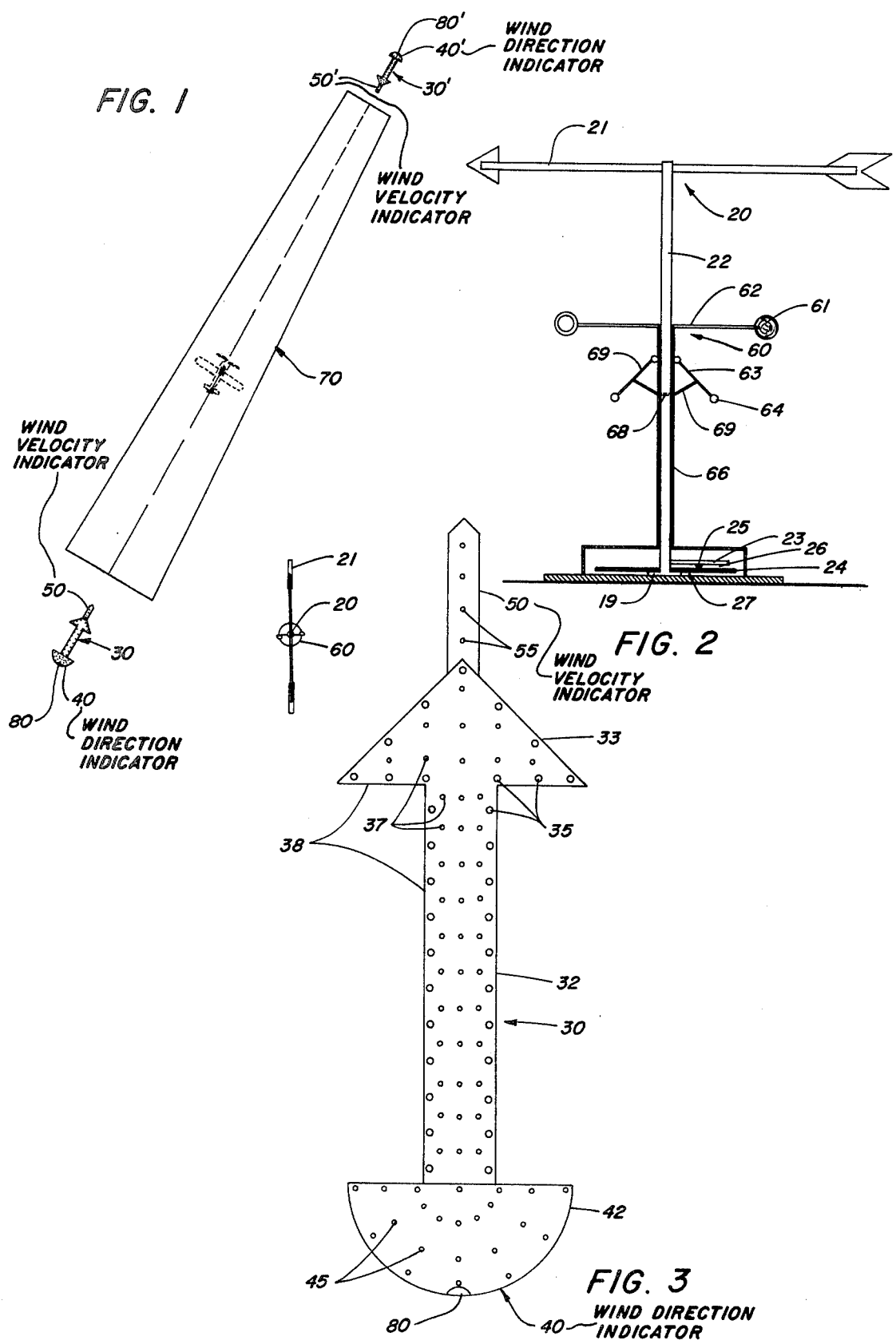

4,201,973

AIRPORT LANDING INDICATOR APPARATUS

BACKGROUND OF THE INVENTION

1. Field of the Invention

This invention relates in general to wind direction indicators for aircraft and in particular to runway locators and lighted wind direction and wind velocity indicator systems.

2. Description of the Prior Art

The perils of landing an aircraft with improper wind direction have long been recognized. This is especially true during night flying where other possible wind indicators as for example trees or brush are obscured by the darkness. A number of systems have been devised as possible solutions to this problem as typified by B. S. Cameron, U.S. Pat. No. 1,422,922; D. Howard, U.S. Pat. No. 1,989,095 and the more recent device of P. C. Barrett, U.S. Pat. No. 3,537,310. While providing a partial solution to the problem, such devices do not, through separate wind directional signals, distinctly point out the preferred landing direction; do not provide long distance lighting with provisions for altering the lighting upon approach to the runway, and are not actuated by remote control for conservation of energy during periods of non-use.

SUMMARY OF THE INVENTION

The present invention comprises generally, airport landing indicator apparatus including means responsive to wind direction and separate runway locators, such locator having an arrow configuration for indicating correct landing direction and including both high and low intensity lamps, the high intensity lamps being controllable by a photoelectric cell actuated by the landing lights of an approaching aircraft. The apparatus may also include a power switch actuated by radio signals from within the aircraft and may additionally include specific wind direction lamps and a lighted wind velocity indicator. A more complete description of the apparatus may be found in the appended claims.

It is therefore an object of the present invention to provide airport landing indicator apparatus having runway locators pointing the exact runway direction.

More particularly, it is an object of the present invention to provide airport landing indicator apparatus having high intensity lamps for distant observation and wherein the lamps may be controlled by the landing lights of the approaching aircraft.

It is a further object of the present invention to provide airport landing indicator apparatus which may be actuated by radio control from an approaching aircraft.

It is also an object of the present invention to provide airport landing indicator apparatus which, by lights, direct a specific landing direction and, additionally, indicates by lights the specific wind direction and velocity.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a diagrammatic plan of a landing field equipped with the airport landing apparatus of the present invention;

FIG. 2 is a diagram of the wind direction and velocity monitor of the present invention;

FIG. 3 is a plan view of a runway locator of the present invention;

FIG. 6 is a schematic of the wind direction monitor and wind velocity monitor of the present invention.

DETAILED DESCRIPTION OF THE INVENTION

Figure 4:
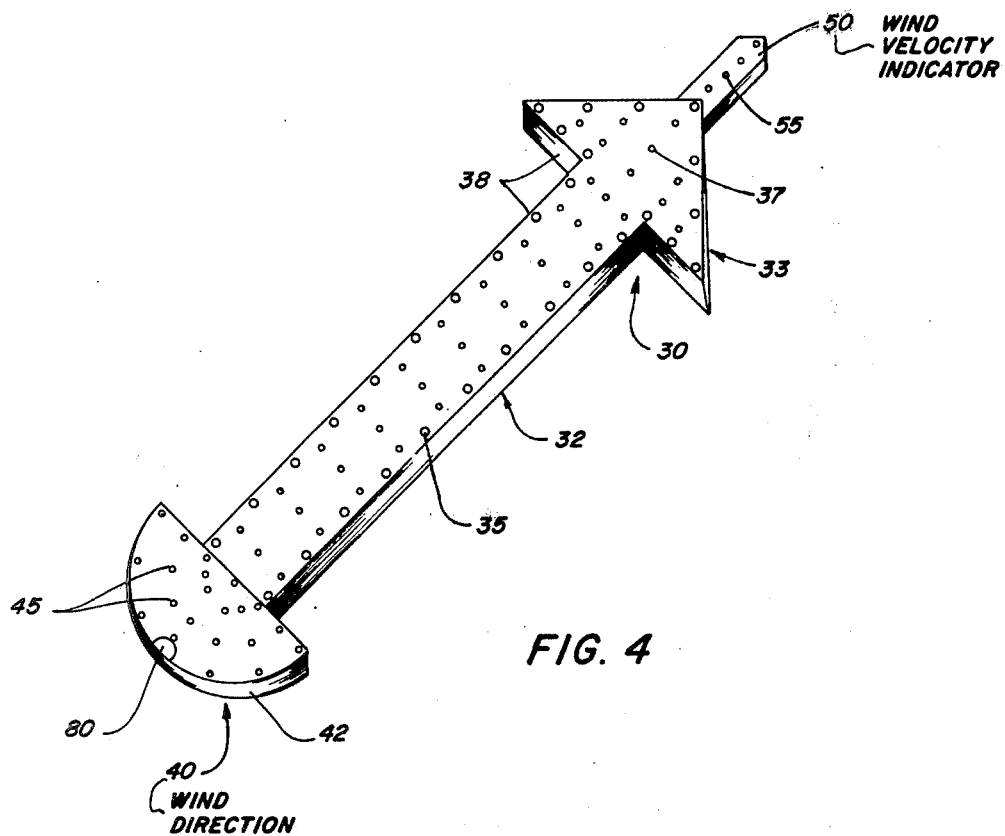
FIG. 4 is a perspective view of a runway locator of the present invention.

Referring now to the drawings, and more particularly to FIG. 1, a preferred embodiment of the airport landing indicator apparatus of the present invention is disclosed. The apparatus may include a wind direction monitor 20; a wind velocity monitor 60; a pair of runway locators 30 and 30'; a pair of specific wind direction indicators 40 and 40'; a pair of wind velocity indicators 50 and 50'; a pair of photoelectric switches 80 and 80' and switches for lighting lamps of the various indicators from an external power source 18, as shown by diagram in FIG. 5.

Figure 5:
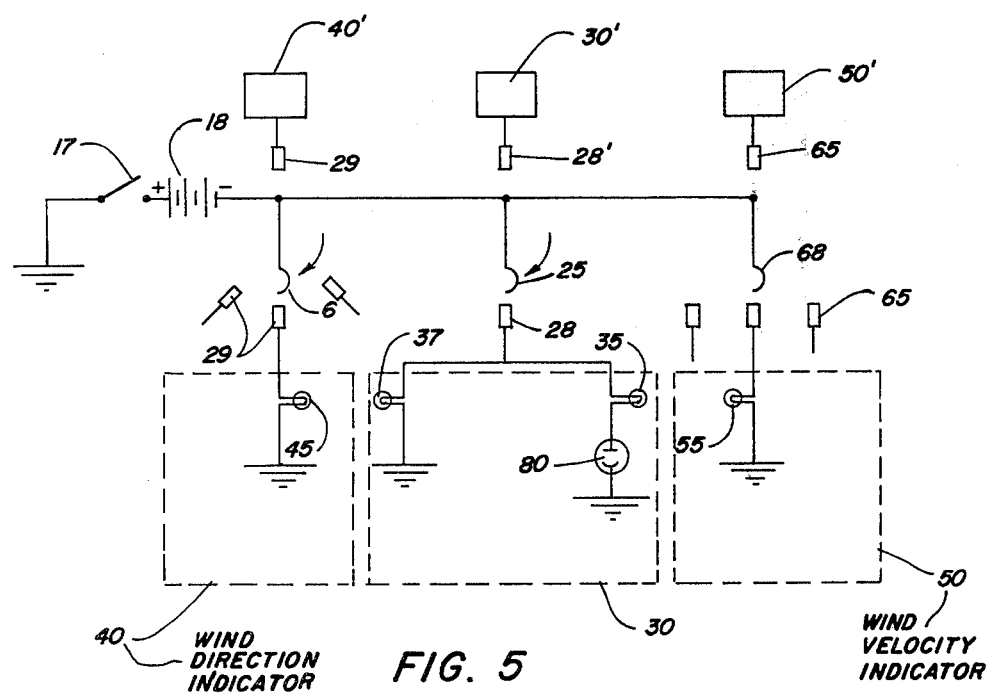
FIG. 5 is a diagram of one embodiment of the wiring of the present invention.

The wind direction monitor 20 is preferably combined in a single unit with wind velocity monitor 60 as shown to advantage in FIG. 2. Weather vane 21 is attached to a freely rotatable vertical shaft 22 mounted in support bearing 19. Shaft 22 may carry at its lower end a contact arm 23 having a pair of contact points 25 and 26 respectively, positioned to move over a pair of circular contact members 24 and 27 which may be concentrically located one within the other in conventional manner. Contact point 25 is operable to contact one of two switching elements 28 and 28', as shown in FIG. 5, to provide power from battery 18 to one only of the two runway locators 30 and 30', respectively. Weathervane 21 may be biased to a power-off position or may be biased to a preferred runway landing direction in the event of a no-wind condition. Contact point 26 is operable to contact one of a plurality of switching elements, collectively designated by numeral 29, to light specific lamps 45 of indicators 40 and 40' to indicate specific wind direction.

Wind velocity monitor 60 includes one or more points of cups 61 of conventional design mounted on horizontal shaft 62, which in turn may be mounted on a tubular shaft 66 concentrically located on the exterior of shaft 22 and resting on a support bearing, not shown. Shaft 66 may include one or more pair of weights 64 pivotally connected by means of arms 63, and which swing outwardly due to centrifugal force as shaft 66 is caused to be rotated by the wind. Pivotally connected at one end to arms 63 are fingers 69. Fingers 69 are connected at their other ends to a common sliding contact 68 for making contact with one each of a plurality of contact points designated generally by the numeral 65 to light specific lamp 55 of wind velocity indicators 50 or 50'.

Runway locators 30 and 30' may be identical in construction and therefore a description of one of the locators shall suffice. Locator 30, as shown in FIGS. 3 and 4, includes an elongated portion 32 and a triangular head portion 33 located at one end of portion 32, the combination of the two portions defining an arrow. The arrow is to be oriented so as to point to the directional approach to the runway when lit. A multiplicity of high intensity lamps 35 surround the perimeter of the arrow and a multiplicity of low intensity lamps 37 are located adjacent to lamps 35 and preferably within the confines of the perimeter defined by the high intensity lamps. The lamps may be mounted in a frame 38 for convenience and for portability or may be placed individually on the ground to define the arrow. High intensity lamps 35 are preferably white in color and are conventional in design, wattage of 100-500 watts being preferred. Low intensity lamps 37 are preferably green or blue in color, may be fluorescent, and are of lower wattage than lamps 35.

Lamps 35 and 37 are supplied with electricity through switching elements 28 and 25 to an external power source 18 which may be batteries, an electrical generator, or other conventional power sources. High intensity lamps 35 are further controlled, in the preferred embodiment, as may be seen in FIG. 5, by on-off switching elements, photoelectric cells 80 and 80', which are shielded from the lamps and directionally pointed backwardly and upwardly to be responsive to landing lights from an approaching aircraft. It is to be understood that photoelectric cells 80 and 80', conventional in nature, may also function to control the light intensity from lamps 35 if desired.

At the rearward most terminal end of elongated portion 32 of locator 30 is specific wind direction indicator means 40. Similarly, specific wind direction indicator means 40' is located rearward to locator 30'. Preferably, specific indicators 40 and 40' include a plurality of rectilinear rows of lamps 45 extending radially in fan shape from a lateral center point at the rearmost terminal of the arrows making up locators 30 and 30', as shown to advantage in FIG. 3. Lamp 45 may be of low intensity, fluorescent and of desired color. Individual rows of Lamp 45 are controllably lighted as above explained by wind direction monitor 20 through switching elements 26 and 29 connected to external power source 18. Specific rows of lamps 45, indicating the direction of weather vane 21 and therefore the correct and specific direction of the wind are lighted to apprise the navigator of ground wind direction. Only rows of lamps of one specific wind direction indicator 40 or 40' are lit at one time in co-ordination with the lighting of lamps of runway locators 30 and 30', respectively. Rows of lamps 45 may, as in locators 30 and 30', be mounted in a frame, frame 42, preferably integral with frame 32 for convenient construction and portability.

Extending axially with elongated portion 32 from the foreward most tip of triangular portion 33 of runway locators 30 and 30', wind velocity indicators 50 and 50', respectively, may be located. Indicators 50 and 50' may include a frame 50 integral with the frames of locators 30 and 30' and preferably include a plurality of lamps 55 set in a straight forwardly extending row and spaced from one another at a distance to be individually, clearly distinguished from the air. A specific lamp 55 may be lit in accordance with a specific wind velocity as measured by wind velocity monitor 60. For example, as shown in FIG. 3, the second lamp in the row may be lit when wind velocity is between 10 and 20 MPH, the lamp nearest the tip of triangular portion 33 may be lit when wind velocity is between 0 and 10 MPH, etc. Individual lamps 55 are controlled by wind velocity monitor 60 through contact elements 65 and 68 and obtain their power from power source 18.

Since the apparatus is expected to have maximum use in remote areas, it is preferred that the external power source be rechargeable batteries through solar power cells. It is also preferred that the system not be in constant use because of the obvious heavy electrical drain on the batteries. For this reason it is contemplated that the system have a switch shown generally by the numeral 17, which may be activated and deactivated by means of remote radio control from an approaching or departing aircraft.

In use, wind direction monitor 20 and wind velocity monitor are in constant operation. Assuming batteries 18 are in a charged condition and switch 17 is open, an approaching aircraft sends a radio signal closing switch 17. Should the wind be coming from a direction shown by the weather vane, FIG. 1, high intensity lamps 35 and low intensity lamps 37 of runway locator 30 will be lit showing the correct approach direction to runway 70. It should be noted that high intensity lamps 35 allow visibility at a great distance and through moderate weather adversity. The aircraft may then align itself for correct approach. Once in a correct and descending approach, the aircraft will turn on its landing lights which provide a light stimulus to photoelectric switch 80 which either dims or turns-off high intensity lamps 35 which may be blinding at lower altitude. Low intensity lamps 37 are still lit providing correct directional approach. As the aircraft continues its landing approach, a specific row of lamps 45 of fan-tail shaped specific wind direction indicator 40 becomes visible, showing either approximate or exact wind direction, depending upon the number of rows of lamps in the fan tail. The pilot may also check which of lamps 55 of wind velocity indicator 50 are lit to enable him to compensate. After landing has been achieved, the pilot may turn the system off by either remote or manual control.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. Airport landing indicator apparatus comprising:
   wind direction monitoring means;
   at least two runway locator means, each of said locator means disposed at opposing ends of a runway and each of said locator means including
   a multiplicity of high intensity lamps set in such configuration as to define an arrow and
   a multiplicity of low intensity lamps adjacent to said high intensity lamps as to define a second arrow, the arrows oriented so as to indicate directional aircraft approach to the runway when lit;
   at least two specific wind direction indicator means, each of said indicator means located at the rear of the arrows defined by the high and low intensity lamps and each of said indicator means including at least two lamps adapted to indicate approximate wind direction; and
   switch means controlled by said wind direction monitoring means and operable to provide electricity from an external power source to light the lamps of a selected locator means and a selected specific wind direction indicator means dependent upon wind direction.

2. The apparatus as described in claim 1 further comprising photosensitive switch means operable to control light output of said high intensity lamps in response to light stimuli from an approaching aircraft.

* * * * *